United States Patent
Gaillard et al.

(10) Patent No.: US 7,700,702 B2
(45) Date of Patent: Apr. 20, 2010

(54) HIGH MOLECULAR WEIGHT ASSOCIATIVE AMPHOTERIC POLYMERS AND USES THEREOF

(75) Inventors: Nicolas Gaillard, Chaponost (FR); Cédrick Favero, Givors (FR)

(73) Assignee: SNF S.A.S., St. Etienne (FR)

( * ) Notice: Subject to any disclaimer, the term of this patent is extended or adjusted under 35 U.S.C. 154(b) by 0 days.

(21) Appl. No.: 10/599,724

(22) PCT Filed: Mar. 29, 2005

(86) PCT No.: PCT/FR2005/050196

§ 371 (c)(1),
(2), (4) Date: Jun. 15, 2007

(87) PCT Pub. No.: WO2005/100423

PCT Pub. Date: Oct. 27, 2005

(65) Prior Publication Data

US 2007/0287815 A1    Dec. 13, 2007

(30) Foreign Application Priority Data

Apr. 7, 2004    (FR) .................... 04 50701

(51) Int. Cl.
*C08F 20/60* (2006.01)
*C08F 20/56* (2006.01)
*C08F 20/06* (2006.01)

(52) U.S. Cl. .................... 526/307.6; 526/264; 526/288; 526/292.95; 526/307; 526/307.2; 526/307.3; 526/307.7; 526/312; 526/317.1; 526/318.2; 526/318.5

(58) Field of Classification Search ................ 526/264, 526/288, 292.95, 307, 307.2, 307.3, 307.6, 526/307.7, 317.1, 318.2, 318.5
See application file for complete search history.

(56) References Cited

U.S. PATENT DOCUMENTS

| | | | | |
|---|---|---|---|---|
| 4,650,848 A | | 3/1987 | Schulz et al. | 526/287 |
| 5,071,934 A | | 12/1991 | Peiffer et al. | 526/307 |
| 5,683,855 A | * | 11/1997 | Shinkai et al. | 430/270.11 |
| 5,879,670 A | | 3/1999 | Melby et al. | 424/70.16 |
| 6,187,887 B1 | * | 2/2001 | Albrecht et al. | 526/264 |
| 6,329,483 B1 | | 12/2001 | Schade et al. | 526/263 |
| 6,395,853 B1 | * | 5/2002 | Oswald et al. | 526/307.2 |
| 6,702,946 B1 | * | 3/2004 | Huang et al. | 210/723 |
| 7,238,760 B2 | * | 7/2007 | Schinabeck et al. | 526/288 |

FOREIGN PATENT DOCUMENTS

| | | |
|---|---|---|
| WO | WO 01/06999 A1 | 1/2001 |
| WO | WO 01/40318 A2 | 6/2001 |

OTHER PUBLICATIONS

Ji, Mei-fang et al. Gongneng Gaofenzi Xuebao (2003), 16(3), 387-391.*

* cited by examiner

*Primary Examiner*—Helen L. Pezzuto
(74) *Attorney, Agent, or Firm*—Heslin Rothenberg Farley & Mesiti P.C.

(57) ABSTRACT

High molecular weight associative amphoteric polymers for increasing the viscosity of aqueous solutions, comprise: at lease one cationic monomer derived from acrylamide bearing at least one hydrophobic chain of 8 to 30 carbon atoms; 1 to 99.9 mole % of at least one anionic monomer; and 1 to 99 mole % of one or several non-ionic water-soluble monomers. Aqueous solutions containing said polymers find uses in industry, in particular the oil, paper, water treatment, mining, cosmetics, textile, detergency industries and generally in all industrial techniques using thickened solutions.

20 Claims, No Drawings

HIGH MOLECULAR WEIGHT ASSOCIATIVE AMPHOTERIC POLYMERS AND USES THEREOF

CROSS REFERENCE TO RELATED APPLICATIONS

This is a Section 371 filing of international application No. PCT/FR2005/050196 filed Mar. 29, 2005, and published, in French, as International Publication No. WO 2005/100423 on Oct. 27, 2005, and claims priority of French Application No. 04.50701 filed Apr. 7, 2004, which applications are hereby incorporated by reference herein, in their entirety.

BACKGROUND ART

The invention concerns novel associative amphoteric polymers for increasing the viscosity of aqueous solutions, as well as aqueous compositions containing said polymers.

By definition, we say that a polymer is polymer viscosifying when it increases the viscosity of the solutions in which it is dissolved.

Among the viscosifying polymers for aqueous solutions included in the state of the art, synthetic polymers such as poly(meth)acrylamides, which may be partially hydrolysed, and poly(meth)acrylates and their copolymers are particularly well known. These polymers develop viscosity due to their molar mass and to interchain ionic repulsions. The mechanism causing viscosity is related to an increase in hydrodynamic volume and interchain repulsions.

However, in the presence of electrolytes, surfactants or a high temperature of use, these polymers do not develop good thickening properties, leading to a sharp decrease in their viscosifying power.

To improve the performances of the aforementioned synthetic polymers, they have been modified by adding hydrophobic groups. The polymers thus obtained (the minority of which have apolar unit cells and the majority of which have hydrophilic unit cells) are called "associative". They require high molecular mass and are characterised in that, when they are placed in solutions, their hydrophobic groups join together to limit interactions with water. The drop in viscosity related to the presence of electrolytes, surfactants or high temperatures, source of a drop in hydrodynamic volume, is compensated for by interchain attractive interactions.

The vast majority of the most common acrylic associative polymers come in the form of an emulsion (in water or reverse or aqueous dispersion). It should be pointed out that reverse emulsion polymerisation is a preferred method well known to those skilled in the art. It notably provides acrylic polymers with high molecular weight and may contain a reasonably high concentration of polymers while remaining fluid. Moreover, the large specific surface of the dispersed phase of the polymer makes solubilisation or swelling of the polymer very rapid.

The hydrophobic monomers used in preparing these polymers may be of 2 types: non-ionic and/or ionic.

Among the non-ionic hydrophobic monomers, we can mention:
  industrially available (meth)acrylic acid esters with an alkyl chain or ethoxylated,
  and acrylamide derivatives with an alkyl or dialkyl chain requiring, for co-polymerisation, difficult implementation not yet having undergone any industrial development.

At the same time, the use of hydrophobic ionic monomers has also been described. This mainly concerns:

cationic allyl derivatives, which have very poor reactivity leading to derivative compounds which are harmful to the desired applications as they form insoluble chains.

or hydrophobic ionic acryloyl derivatives (anionic or cationic), these being mentioned as potential monomers but very rarely exemplified and never described in powder form.

During research on the preparation of new amphoteric polymers used to increase the viscosity of aqueous compositions, whatever their salinity, their surfactant composition or their temperature, the applicant took a closer look at associative amphoteric polymers.

The previous state of the art shows:

U.S. Pat. No. 5,071,934 concerning the preparation of associative cationic polymers which can be interpreted as amphoteric in extreme cases, obtained in an emulsion. No examples are given concerning polymerisation for obtaining amphoteric polymers: the examples deal with copolymerisation in emulsions of acrylamide, methacrylamido-propyl trimethyl-ammonium chloride (MAPTAC) and dimethyl aminopropylamine (DMAPA) quaternised with an alkyl chain with 8 to 14 carbons.

Patent WO 01/40318 which protects a new method of synthesis in a liquid solution of hydrophobic polymers which may be amphoteric but is not exemplified.

Exxon patent U.S. Pat. No. 4,650,848 which describes non-charged associative hydrophobic AMD/AMD terpolymers/betaine: the amphoteric aspect of these polymers is introduced by a zwitterionic monomer which alone carries both charges in exactly equal quantities.

Calgon patent WO 01/06999 concerning low molecular weight (less than 10,000 g·mol$^{-1}$) hydrophobic amphoteric polymers, whose apolar groups are carried by an anionic and/or non-ionic monomer. Given their low molecular weight, these polymers have no viscosifying effect.

None of aforementioned products, however, has to date undergone industrial development due to their inherent inconveniences: lack of viscosity, stability over time, temperature stability, and/or problems related to their preparation or implementation.

DESCRIPTION OF THE INVENTION

The applicant has discovered and developed novel associative acrylic amphoteric polymers, characterised in that they have a molecular weight of at least 50,000 g/mol, in practice between 50,000 g/mol and 30·10$^6$ g/mol, and in that they include:

at least one acrylamide-derived cationic monomer containing a hydrophobic chain and with the general formula:

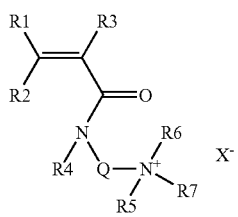

where:
  R1, R2, R3, R4, R5, R6, independently, a hydrogen or an alkyl chain containing 1 to 4 carbons Q: an alkyl chain containing 1 to 8 carbons R7: an alkyl or arylalkyl chain containing 8 to 30 carbons X: a halide selected from the group including bromide, chloride, iodide, fluoride or a counterion with a negative charge.

between 1 and 99.9 mole % of at least one anionic monomer. The useful anionic monomers in this invention can be selected from a wide group. These monomers may present acrylic, vinyl, maleic, fumaric or allyl functionalities and may contain a carboxy, phosphonate, sulfonate or other group with an anionic charge, or the ammonium salt or alkaline-earth metal salt or alkaline metal salt corresponding to such a monomer. Examples of suitable monomers include acrylic acid, methacrylic acid, itaconic acid, crotonic acid, maleic acid, fumaric acid and strong-acid monomers, for example with a sulfonic or phosphonic acid-type function such as 2-acrylamido-2-methylpropane sulfonic acid, vinylsulfonic acid, vinylphosphonic acid, allylsulfonic acid, allylphosphonic acid, styrene sulfonic acid and their water-soluble salts of an alkali metal, alkaline-earth metal and ammonium.

and between 1 and 99 mole % of at least one non-ionic hydrosoluble monomer. The useful non-ionic monomers in this invention can be selected from the group including water-soluble vinyl monomers. The preferred monomers belonging to this category are advantageously selected from the group including acrylamide and methacrylamide, N-isopropylacrylamide, N—N-dimethylacrylamide and N-methylolacrylamide. N-vinylformamide, N-vinyl acetamide, N-vinylpyridine and/or N-vinylpyrrolidone can also be used. Acrylamide will be the preferred non-ionic monomer.

Surprisingly, it was discovered that it is possible to obtain associative polymers which, with an equal molecular weight and whatever the conditions of use, develop a viscosifying effect in the aqueous composition greater than that of the former state of the art, using an amphoteric polymer according to the invention, based on one or a mixture of acrylamide-derived hydrophobic cationic monomers, based on one or a mixture of anionic monomers and based on one or a mixture of non-ionic hydrosoluble monomers.

Along with the improved viscosifying effect, the selection of this type of polymer also provides shorter solution times.

The polymers in the invention do not require developing a particular polymerisation process. They can be obtained by all the polymerisation techniques well known to those skilled in the art (solution polymerisation, gel polymerisation, precipitation polymerisation, emulsion polymerisation [aqueous or reverse], whether followed or not by spray drying, suspension polymerisation, micellar polymerisation, whether followed or not by a precipitation step).

The invention also concerns the previously described branched and/or cross-linked associative amphoteric polymers. The usable branching agents (cross-linking agents) are N-methylol acrylamide, methylene bis acrylamide, allyl ethers of sucrose, diacrylates, divinyls and all other multi-function compounds which can cause branching. One could also use one of the known branching agents for diallylated compounds such as methyl triallyl ammonium chloride, triallylamine, tetraallyl ammonium chloride, tetra allyl oxyethane, tetra allyl ethylene diamine and, more generally, all polyallylated compounds. It is also possible to make post-cross-linked polymers, for example by amidation reaction, esterification reaction, gamma ray treatment, etc.

The invention also concerns the use of the aforementioned associative polymers, whether branched and/or cross-linked or not, as well as the gels containing them in the oil, paper, water treatment, mining, cosmetics, textile and detergence industries.

The associative amphoteric polymers in the invention are preferably polymers with:

between 0.005 and 10 mole % hydrophobic cationic monomer between 5 and 90 mole % of at least one anionic monomer, advantageously acrylic acid and/or methacrylic acid and/or 2-acrylamido-2-methylpropane sulfonic acid and their salts;

and between 5 and 90 mole % of at least one hydrosoluble non-ionic monomer, advantageously acrylamide and/or methacrylamide and/or N-isopropylacrylamide and/or N—N-dimethylacrylamide and/or N-vinylformamide and/or N-vinyl acetamide and/or N-vinylpyrrolidone.

According to an advantageous embodiment, the associative polymers contain between 0.01 and 5 mole % of hydrophobic monomers and between 10 and 60 mole % of an anionic monomer and between 35 and 90 mole % of a non-ionic monomer.

Preferably, the associative polymers contain between 0.02 and 2 mole % of hydrophobic monomers and between 10 and 50 mole % of an anionic monomer: acrylic acid, methacrylic acid and/or 2-acrylamido-2-methylpropane sulfonic acid and their salts, and between 48 and 90 mole % of a non-ionic monomer: acrylamide and/or methacrylamide and/or N-isopropylacrylamide and/or N—N-dimethylacrylamide and/or N-vinylformamide and/or N-vinyl acetamide and/or N-vinylpyrrolidone.

The acrylamide-derived hydrophobic cationic monomers preferred for the invention are N-acrylamidopropyl-N,N-dimethyl-N-dodecyl ammonium chloride (DMAPA Cl(C12)), N-methacrylamidopropyl-N,N-dimethyl-N-dodecyl ammonium chloride (DMAPMA Cl(C12)), N-acrylamidopropyl-N,N-dimethyl-N-dodecyl ammonium bromide (DMAPA Br(C12)), N-methacrylamidopropyl-N,N-dimethyl-N-dodecyl ammonium bromide (DMAPMA Br(C12)), N-acrylamidopropyl-N,N-dimethyl-N-octadecyl ammonium chloride (DMAPA Cl(C18)), N-methacrylamidopropyl-N, N-dimethyl-N-octadecyl ammonium chloride (DMAPMA Cl(C18)), N-acrylamidopropyl-N,N-dimethyl-N-octadecyl ammonium bromide (DMAPA Br(C18)), N-methacrylamidopropyl-N,N-dimethyl-N-octadecyl ammonium bromide (DMAPMA Br(C18)).

We should point out that, to facilitate the addition of hydrophobic cationic monomers during polymerisation, those skilled in the art are aware that surfactants, whether ionic or not, can be used. In the context of this invention, the quantity of surfactant added is, however, much lower than the quantities used in micellar polymerisation (which are approximately 20 moles and more of surfactant per mole of hydrophobic monomer).

Likewise, the use of cosolvents such as tert-butanol, isopropanol, butanol, hexanol, pentanol, glycerol, etc. may be envisaged to help solubilise these monomers.

Moreover, optionally and in combination with the aforementioned monomers in the invention (acrylamide-derived hydrophobic cationic+anionic+non-ionic), one or more other monomers, whether ionic or not, hydrosoluble or not, may also be used in proportions preferably less than 20 mole %. For example, one may use monomers such as dialkylaminoalkyl (meth)acrylate, dialkylaminoalkyl (meth)acrylamide, diallylamine, methyldiallylamine and their quaternary ammonium salts or acid salts, etc., acrylamide derivatives such as N-alkylacrylamides, for example N-tert-butylacrylamide, octylacrylamide as well as N,N-dialkylacrylamides such as N,N-dihexylacrylamide, etc., derivatives of acrylic acid such as hydroxyalkyl acrylates and methacrylates or other monomers, whether ionic or not, hydrosoluble or not, such as allyl derivatives, styrene, acrylate esters which may contain ethoxylated chains or not terminating with an alkyl or arylalkyl chain . . . .

Preferably, the associative polymers in the invention come in a dry, powder or granular form and are obtained directly by gel polymerisation, precipitation polymerisation or suspension polymerisation.

According to another characteristic, the molecular weight of the associative amphoteric polymer is greater than 50,000, advantageously greater than 100,000 and preferably greater than 200,000 g/mol. In practice, the polymers are used at a concentration greater than 500 ppm, preferably greater than 800 ppm and preferably greater than 1,000 ppm.

The invention also concerns an aqueous composition containing the aforementioned associative polymers used as viscosifying agents.

The invention will now be fully illustrated using the following non-limiting examples, and notably which will not be considered as being limited to the compositions and forms of the polymers.

EXAMPLES

Cationic Monomer Synthesis

The hydrophobic cationic monomers derived from acrylamide or methacrylamide used in the examples were obtained using the general preparation scheme well known to those skilled in the art and as described below. This entails a quaternisation reaction of an N,N-dimethylaminopropyl(meth)acrylamide (DMAP(M)A) molecule by an alkyl or arylalkyl halide, obtained in a solvent medium at 50° C. The general process of synthesis is notably described in example 1 of U.S. Pat. No. 3,948,979, where N,N-dimethylaminoethyl acrylate has been replaced by N,N-dimethylaminopropylacrylamide (examples A) or by N,N-dimethylaminopropylmethacrylamide (examples M).

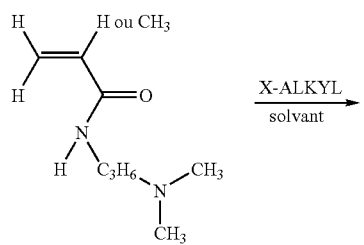

-continued

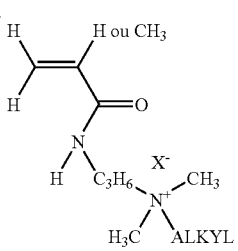

ALKYL: corresponding to an alkyl or arylalkyl chain with 8 to 30 carbons

X: a halide which may be bromide, chloride, iodide, fluoride, or any counterion with a negative charge.

Preparation of the Polymer by Gel Polymerisation (Examples G: Ag or Mg):

In a beaker, dissolve x mole % of an acrylamide-derived hydrophobic cationic monomer, y mole % of acrylic acid, z mole % of acrylamide in water to obtain a 30% active ingredient content. The aforementioned additives may advantageously be added at this point to improve the solubilisation of the monomers. The sum of x+y+z is equal to 100. The solution is then stirred, cooled and neutralised by adding soda. The solution is then placed in a Dewar vessel and degassed with a nitrogen flow to remove the oxygen.

Polymerisation is initiated using a red/ox pair. The temperature rises adiabatically.

The gel obtained is left in the Dewar vessel for 3 hours. It is then ground and dried overnight in an oven. A white powder is obtained and is ground once again.

Preparation of the Polymer by Precipitation Polymerisation (Examples P: Ap or Mp):

The process used is described in example 3 of Rohm & Haas patent EP 63018, adapted to our monomers.

For each polymer obtained, the molar masses were determined by static light scattering.

Example 1

Viscosifying Effect of the Polymers in the Invention in Relation to their Conditions of Use The powders obtained were solubilised in various brines and the viscosity of the solutions was measured under different conditions of shearing and temperature. The results are given in tables 1, 2 and 3.

Unless indicated, the counterion of the cationic monomer is a chloride, x corresponds to the mole percentage of the hydrophobic cationic monomer(s) and y corresponds to the mole percentage of the anionic monomer.

TABLE 1 measurement of the viscosity of the associative amphoteric products in deionised water at 20° C.

| | R7 | x/y mole % | $M_w$ ($10^6$ g·mol$^{-1}$) | C (ppm) | Viscosity (cps) at 7 s$^{-1}$ | Viscosity (cps) at 100 s$^{-1}$ |
|---|---|---|---|---|---|---|
| Ag1 | $C_{12}H_{25}$ | 0.7/27 | 6.4 | 10,000 | 9,780 | 685$^a$ |
| Ap2 | $C_{18}H_{37}$ | 5/20 | 0.2 | 40,000 | 2,350 | 660$^a$ |
| Ag3 | $C_{12}H_{25}$ | 1/27 | 2.5 | 5,000 | 1,040 | 205$^a$ |

TABLE 2 measurement of the viscosity of the associative amphoteric products in brines at 24° C.

|  | R7 | x/y mole % | $M_w$ ($10^6$ g·mol$^{-1}$) | C (ppm) | Salt concentration in the brine (ppm) | Viscosity (cps) |
|---|---|---|---|---|---|---|
| Ag4 | $C_{18}H_{37}$ | 0.035/30 | 16.8 | 1,000 | 58,500 | 9.8$^b$ |
| Mg4 | $C_{18}H_{37}$ | 0.035/30 | 16.8 | 5,000 | 5,700 | 1,350$^c$ |
| Ag5 | $C_{12}H_{25}$ | 0.4/25 | 6.4 | 1,000 | 58,500 | 5.6$^b$ |
| Ag6$^{m,r}$ | $C_{12}H_{25}$ | 0.4/25 | 6.4 | 5,000 | 5,700 | 3,100$^c$ |
| Ag7 | $C_{12}H_{25}/C_{18}H_{37}$ | (0.5/0.05)/30 | 6.4 | 5,000 | 5,700 | 10,000$^c$ |
| Ap8 | $C_{12}H_{25}$ | 5/20 | 0.2 | 40,000 | 5,700 | 165$^a$ |
| Ag9$^n$ | $C_{12}H_{25}$ | 0.4/27 | 2.5 | 5,000 | 0 | 3,000$^c$ |

TABLE 3 measurement of the viscosity of the associative amphoteric products at different temperatures

|  | R7 | x/y mole % | $M_w$ ($10^6$ g·mol$^{-1}$) | C (ppm) | Salt concentration in the brine (ppm) | T (° C.) | Viscosity (cps) |
|---|---|---|---|---|---|---|---|
| Mg4 | $C_{18}H_{37}$ | 0.035/30 | 16.8 | 1,500 | 5,700 | 70 | 70$^d$ |
| Ag10$^{o,r}$ | $C_{12}H_{25}$ | 0.6/25 | 6.4 | 2,000 | 10,800 | 65 | 300$^a$ |
| Ag11$^{p,r}$ | $C_{12}H_{25}$ | 0.6/27 | 6.4 | 1,500 | 32,800 | 70 | 80$^d$ |
| Ag12$^q$ | $C_{12}H_{25}$ | 0.4/20 | 6.4 | 5,000 | 10,800 | 50 | 3,600$^a$ |
| Ag13$^r$ | $C_{12}H_{25}$ | 0.7/27 | 6.4 | 2,000 | 10,800 | 65 | 380$^a$ |

C: concentration of the polymer in the brine, in ppm.
$^a$viscosity was measured with a Carri-Med (model CSL 100) with cone-plate geometry (diameter = 6 cm, angle = 2°) at 7 s$^{-1}$ and 100 s$^{-1}$.
$^b$measurement performed with a Brookfield viscometer, model LVT, at 60 rpm.
$^c$measurement performed with a DV-II+ viscometer, model DV-II+, at 30 rpm.
$^d$viscosity was measured with a Brookfield viscometer, model LVT, at 6 rpm.
$^m$polymer obtained in the presence of a cross-linking agent: 3 ppm of methylene bis acrylamide (MBA).
$^n$polymer containing 1 mole % of tert-octylacrylamide.
$^o$polymer containing 2 mole % of N-isopropylacrylamide.
$^p$polymer containing 2 mole % of 2-acrylamido-2-methylpropane sulfonic acid.
$^q$polymer containing 2 mole % de N-vinylpyrrolidone.
$^r$the counterion of the hydrophobic monomer is not a chloride but rather a bromide.

Example 2

Relative Viscosity Test

To precisely compare the efficacy (viscosifying power) of the products in the invention, various polymers were prepared under strictly identical conditions: same procedure (cf. preparation of the polymer) and same molar compositions, according to the following table.

|  | Cationic monomer | | Non-ionic monomer Hydro- | Anionic monomer Non- |
|---|---|---|---|---|
|  | Hydrophobic | Non hydrophobic | phobic Acrylate- | hydrophobic |
|  | Acrylamido-type | Allyl-type | type |  |
| Inv. | YES | NO | NO | YES |
| xanio | NO | NO | NO | YES |
| xampho | NO | NO | YES | YES |
| xHampho | NO | NO | YES | YES |
| xHLampho | NO | YES | NO | YES |
| xHcatio | YES | NO | NO | NO |

The viscosity of the products noted x (Vx) was compared with that of the polymers in the invention (Vinv) under various conditions (deionised water, brine, at different concentrations and at different temperatures).

Coefficient R, which is expressed in a percentage, is defined by the following relation:

$$R=((Vinv-Vx)/Vx)\times 100$$

The higher R is, the more the viscosifying power of the polymers in the invention differs from that of the "standard" polymers in the industry.

TABLE 4 measurement of coefficient R in relation to a polymer obtained by gel polymerisation and containing 0.035 mole % of a cationic monomer and 30 mole % of an anionic monomer (the polymer used as the reference is Ag4). Viscosity measurements performed at 5,000 ppm of polymer with Carri-Med at 7s$^{-1}$ at 20° C. The brine at 5,700 ppm of salts contains 108 ppm of divalent ions (calcium chloride and magnesium chloride).

| Products | Deionised water 20° C. | Brine at 5,700 ppm 20° C. | Deionised water 70° C. |
|---|---|---|---|
| xanio | +64% | +249% | +22% |
| xampho | +61% | +254% | +25% |
| xHampho | +8% | +7% | +130% |

TABLE 4-continued measurement of coefficient R in relation to a polymer
obtained by gel polymerisation and containing 0.035
mole % of a cationic monomer and 30 mole % of an anionic
monomer (the polymer used as the reference is Ag4).
Viscosity measurements performed at 5,000 ppm of
polymer with Carri-Med at $7s^{-1}$ at 20° C. The brine
at 5,700 ppm of salts contains 108 ppm of divalent ions
(calcium chloride and magnesium chloride).

| Products | Deionised water 20° C. | Brine at 5,700 ppm 20° C. | Deionised water 70° C. |
|---|---|---|---|
| xHLampho | +21% | +132% | +19% |
| xHcatio | +2,000% | insoluble | +3,800% |

TABLE 5 measurement of coefficient R in relation to a polymer
obtained by gel polymerisation and containing 0.6 mole
% of a cationic monomer and 27 mole % of an anionic monomer
(the polymer in the invention used as the reference is Ag11).
Viscosity measurements performed at 1,500 ppm of
polymer with Carri-Med at $7s^{-1}$. The brine at 32,800
ppm of salts contains 1,040 ppm of divalent ions
(calcium chloride and magnesium chloride).

| Products | Deionised water 20° C. | Brine at 32,800 ppm 20° C. | Deionised water 70° C. |
|---|---|---|---|
| xanio | +41% | +135% | +800% |
| xampho | +38% | +130% | +750% |
| xHampho | +11% | +31% | +208% |
| xHLampho | +100% | insoluble | +140% |
| xHcatio | +400% | +82% | +230% |

TABLE 6 measurement of coefficient R in relation to a polymer obtained by
precipitation polymerisation and containing 5 mole % of a cationic
monomer and 20 mole % of an anionic monomer (the polymer in the
invention used as the reference is Ap8).
Viscosity measurements performed at 40,000 ppm of polymer with
Carri-Med at $7s^{-1}$. The brine at 5,700 ppm of salts contains
108 ppm of divalent ions (calcium chloride and magnesium chloride).

| Products | Deionised water 20° C. | Brine at 5,700 ppm 20° C. | Deionised water 70° C. |
|---|---|---|---|
| xanio | +1,100% | +1,150% | +1,570% |
| xampho | +1,000% | +1,130% | +1,500% |
| xHampho | +163% | +790% | +4,400% |
| xHLampho | +28% | +30% | +20% |
| xHcatio | +20% | +50% | +40% |

CONCLUSION

Tables 1 to 6

It has been observed that, according to the invention, the use of an amphoteric polymer based on a hydrophobic cationic monomer derived from acrylamide or methacrylamide increases the viscosity of deionised water solutions, but also of saline solutions.

This effect of increasing viscosity may even be obtained with polymers containing very little hydrophobic cationic monomer and even at low polymer concentrations (<1,000 ppm).

The gain in viscosity can also be observed at different temperatures, at different shear rates and with different measurement methods.

Moreover, the novel associative amphoteric polymers in the invention, under identical conditions of molecular weight and molar composition (anionicity and/or cationicity), demonstrated a level of performance (gain in viscosity) significantly much higher than that obtained with the "standard" polymers (tables 4 to 6).

Given their physical properties, the polymers in the invention are useful ingredients for increasing the viscosity of all water-based compositions.

The invention also covers all forms of embodiment and all applications which will be directly accessible to those skilled in the art upon reading this application, through his/her own knowledge and possibly though simple routine tests.

The invention claimed is:

1. An associative amphoteric polymer having a weight average molecular weight ($M_w$) greater than 50,000 g/mol consisting of:
   (a) between 0.005 and 10 mole % of at least one acrylamide-derived cationic monomer containing a hydrophobic chain and with the general formula:

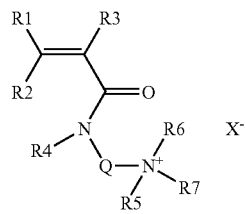

where
   R1, R2, R3, R4, R5, R6, independently, a hydrogen or an alkyl chain containing 1 to 4 carbons;
   Q: an alkyl chain containing 1 to 8 carbons;
   R7: an alkyl or arylalkyl chain containing 8 to 30 carbons;
   X: a counterion with a negative charge;
   (b) between 1 and 30 mole % of at least one anionic monomer containing acrylic, vinyl, maleic, fumaric or allyl functionalities and containing a group selected from carboxy, phosphonate or sulfonate and/or their ammonium salts or alkaline-earth metal salts or alkali metal salts; and
   (c) between 1 and 99 mole % of at least one acrylamide-derived non-ionic hydrosoluble monomer;
   wherein said amphoteric polymer is characterized by a monomeric molar ratio of x/y, in which x corresponds to the mole percentage of said cationic monomer containing a hydrophobic chain, y corresponds to the mole percentage of said anionic monomer, and y>x.

2. An associative amphoteric polymer as claimed in claim 1 wherein the anionic monomer is selected from the group consisting of acrylic acid, methacrylic acid, itaconic acid, crotonic acid, maleic acid, fumaric acid, 2-acrylamido-2-methylpropane sulfonic acid, vinylsulfonic acid, vinylphosphonic acid, allylsulfonic acid, allylphosphonic acid and/or their alkali metal, alkaline-earth metal or ammonium water-soluble salts.

3. An associative amphoteric polymer as claimed in claim 1 wherein the acrylamide-derived non-ionic hydrosoluble monomer comprises a water-soluble vinyl monomer selected from the group consisting of acrylamide and methacrylamide, N-isopropylacrylamide, N-N-dimethylacrylamide, and N-methylolacrylamide.

4. An associative amphoteric polymer as claimed in claim 1 wherein said polymer is branched and/or cross-linked and additionally comprises a branching and/or cross-linking agent.

5. An associative amphoteric polymer as claimed in claim 4 wherein the branching and/or cross-linking agent is selected from the group consisting of N-methylol acrylamide, methylene bis acrylamide, allyl ethers of sucrose, diacrylates, divinyls, diallylated compounds, methyl triallyl ammonium chloride, triallylamine, tetraallyl ammonium chloride, tetra allyl oxyethane and tetra allyl ethylene diamine.

6. An associative amphoteric polymer as claimed in claim 1 in dry, powder or granulate form.

7. An associative amphoteric polymer as claimed in claim 1 comprising:
(a) between 0.005 and 10 mole % of a hydrophobic cationic monomer,
(b) between 5 and 30 mole % of an acidic component comprising one or more of acrylic acid, methacrylic acid and 2-acrylamido-2-methylpropane sulfonic acid or their salts, and
(c) between 5 and 90 mole % of at least one acrylamide-derived non-ionic hydrosoluble monomer amide chosen from the group consisting of acrylamide, methacrylamide, N-isopropylacrylamide, and N-N-dimethylacrylamide.

8. An associative amphoteric polymer as claimed in claim 1 wherein the acrylamide-derived hydrophobic cationic monomer is selected from the group consisting of N-acrylamidopropyl-N,N-dimethyl-N-dodecyl ammonium chloride, N-methacrylamidopropyl-N, N-dimethyl-N-dodecyl ammonium chloride, N-acrylamidopropyl-N,N-dimethyl-N-dodecyl ammonium bromide, N-methacrylamidopropyl-N,N-dimethyl-N-dodecyl ammonium bromide, N-acrylamidopropyl-N,N-dimethyl-N-octadecyl ammonium chloride, N-methacrylamidopropyl-N,N-dimethyl-N-octadecyl ammonium chloride, N-acrylamidopropyl-N,N-dimethyl-N-octadecyl ammonium bromide and N-methacrylamidopropyl-N,N-dimethyl-N-octadecyl ammonium bromide.

9. An associative amphoteric polymer as claimed in claim 1 further comprising at least one other monomer, whether ionic or not, hydrosoluble or not, accounting for less than 20 mole % and selected from the group consisting of monomers of dialkylaminoalkyl (meth)acrylate, dialkylaminoalkyl (meth)acrylamide, diallylamine, methyldiallylamine and their quaternary ammonium salts or acid salts, acrylamide derivatives, derivatives of acrylic acid, hydroxyalkyl acrylates and methacrylates, allyl derivatives, styrene acrylate esters containing ethoxylated chains and acrylate esters not terminating with an alkyl or arylalkyl chain.

10. An associative amphoteric polymer as claimed in claim 1 having a weight average molecular weight ($M_w$) greater than 100,000 g/mol.

11. An aqueous composition containing as a thickening agent at least one polymer as claimed in claim 1.

12. The associative amphoteric polymer of claim 1, wherein R7 is an alkyl or arylalkyl chain containing 8 to 20 carbons.

13. The associative amphoteric polymer of claim 1 wherein X is a halide selected from the group consisting of bromide, chloride, iodide and fluoride.

14. The associative amphoteric polymer of claim 7, comprising:
(a) between 0.01 and 5 mole % of the hydrophobic cationic monomer,
(b) between 10 and 30 mole % of an acidic component comprising one or more of: acrylic acid, methacrylic acid and 2-acrylamido-2-methylpropane sulfonic acid or their salts, and
(c) between 35 and 90 mole % of at least one acrylamide-derived non-ionic hydrosoluble monomer chosen from the group consisting of acrylamide, methacrylamide, N-isopropylacrylamide, and N-N-dimethylacrylamide.

15. The associative amphoteric polymer of claim 14, comprising:
(a) between 0.02 and 2 mole % of the hydrophobic cationic monomer,
(b) between 10 and 30 mole % of said acidic component and
(c) between 48 and 90 mole % of said acrylamide-derived non-ionic hydrosoluble monomer.

16. The associative amphoteric polymer of claim 10 having a weight average molecular weight ($M_w$) greater than 200,000 g/mol.

17. The associative amphoteric polymer of claim 1 wherein said anionic monomer contains a carboxylic acid group or a salt thereof.

18. The associative amphoteric polymer of claim 17 wherein said anionic monomer is acrylic acid or a salt thereof.

19. The associative amphoteric polymer of claim 12 wherein R7 is an alkyl chain containing 12 to 18 carbon atoms.

20. The associative amphoteric polymer of claim 17 comprising between 1 and 30 mole % of said anionic monomer containing a carboxylic acid group or a salt thereof.

* * * * *